US Patent [19] [11] 3,747,991
Ritsema et al. [45] July 24, 1973

[54] PNEUMATIC VARIABLE ORIFICE FOR ADAPTIVE BRAKING

[75] Inventors: Irving R. Ritsema; Frederick E. Goerke, both of South Bend, Ind.

[73] Assignee: The Bendix Corporation, South Bend, Ind.

[22] Filed: Mar. 15, 1972

[21] Appl. No.: 234,769

[52] U.S. Cl............................ 303/21 F, 188/181 A
[51] Int. Cl................................................ B60t 8/06
[58] Field of Search.................. 188/181 A; 303/20, 303/21 F; 91/454, 457

[56] References Cited
UNITED STATES PATENTS
3,592,514  7/1971  DeHoff............................ 303/21 F
3,494,671  2/1970  Slavin et al. ...................... 303/20 X Primary Examiner—Allen N. Knowles
Assistant Examiner—Gene A. Church
Attorney—Ken C. Decker

[57] ABSTRACT

A vacuum-actuated adaptive braking modulator provides a non-linear brake pressure build curve without requiring a multiplicity of solenoid valves. The device includes the usual diaphragm slidably mounted within a housing and which defines a pair of compartments between opposite sides of the diaphragm and corresponding ends of the housing, and a slow pressure bleed orifice extending through the diaphragm that permits restricted fluid communication from one compartment to the other during a brake pressure build operation. The diaphragm includes a flexible resilient portion which interconnects the rigid portion of the diaphragm to the wall of the housing. A plurality of passages in addition to the slow bleed orifice extend through the rigid portion of the diaphragm to communicate one of the chambers with the other. When the diaphragm is disposed in an extreme actuated position, the flexible portion of the diaphragm is moved away from the passages to permit fluid communication through the latter between the chambers. However, as the diaphragm moves in the return direction, the diaphragm progressively closes the passages, thereby reducing the size of the total area of the passages communicating the chambers with one another, and thereby reducing the rate at which the diaphragm moves. Since the brake pressure build rate is governed by the rate of movement of diaphragm, the brake pressure build rate will be relatively large when the diaphragm is disposed in the extreme actuated position, and will be progressively reduced as the diaphragm moves in the return direction.

7 Claims, 2 Drawing Figures

Patented July 24, 1973  3,747,991

3,747,991

PNEUMATIC VARIABLE ORIFICE FOR ADAPTIVE BRAKING

BACKGROUND OF THE INVENTION

This invention relates to a vacuum-actuated adaptive braking modulator.

A vehicle adaptive braking system in which a logic controller actuates a vacuum-actuated modulator is disclosed in U. S. Pat. No. 3,494,671 (Slavin et al), owned by the assignee of the present invention and incorporated herein by reference. This modulator responds to an electronic control unit to first decay braking pressure when the controlled wheel decelerates at a predetermined critical level, and then builds braking pressure at a first rate when the wheel reaccelerates to a first predetermined acceleration level, and thereafter builds braking pressure at a second higher rate when the wheel accelerates in excess of a second predetermined level. In order to provide the dual build rates, an extra solenoid valve is required. While this device works satisfactorily, it is desirable to provide an even more non-linear brake pressure build rate, while reducing the number of solenoid valves required.

SUMMARY OF THE INVENTION

Therefore, an important object of the present invention is to provide a vacuum-actuated adaptive braking modulator having a non-linear brake pressure build curve.

Another important object of my invention is to provide a vacuum-actuated adaptive braking modulator in which, with a high initial brake pressure, the build rate will be relatively fast, in that with low initial brake pressures, the build rate will be slower.

DETAILED DESCRIPTION

Figure 1:
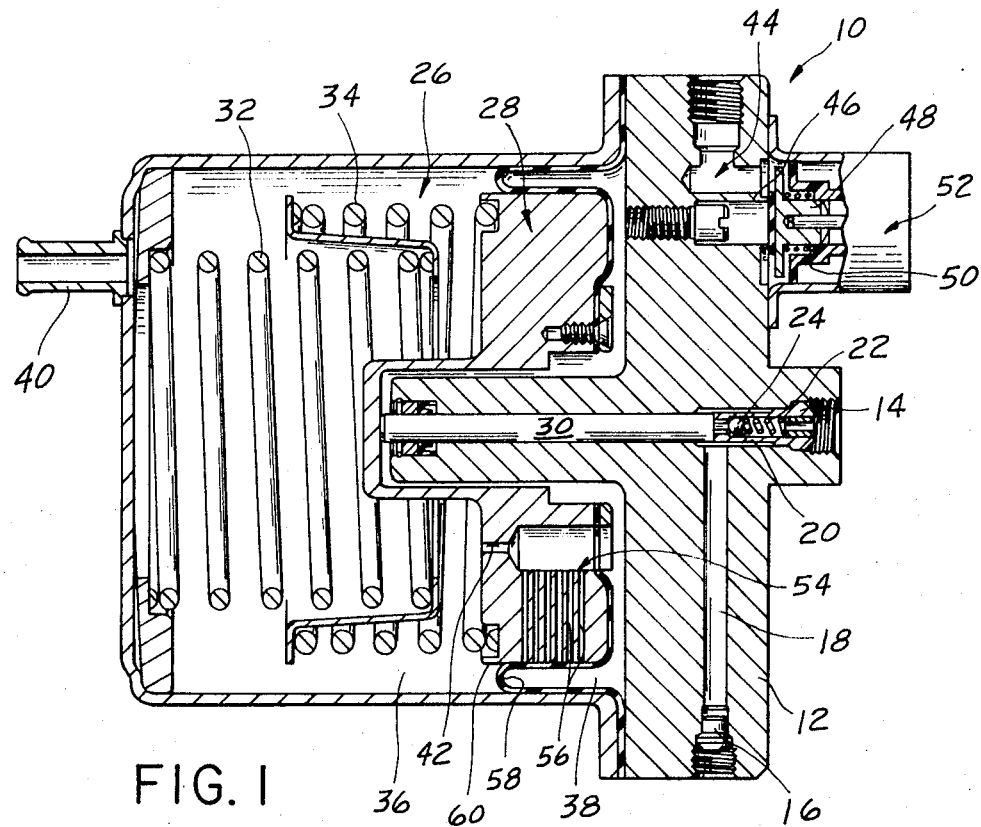
FIG. 1 is a cross-sectional view of a vacuum-actuated adaptive braking modulator made pursuant to the teachings of our present invention.

Referring now to the drawings, a vacuum-actuated adaptive braking modulator generally indicated by the numeral 10 includes a housing 12 having an inlet port 14, which is communicated to the outlet of the vehicle's master cylinder (not shown), and an outlet port 16, which is communicated to the wheel cylinders (not shown) of the vehicle. A passage 18 is provided within the housing 12 communicating the inlet port 14 with the outlet port 16 and includes a valve seat 20 against which a spring 22 yieldably urges a sphere 24 to prevent fluid communication between the inlet and outlet when the sphere is urged against the seat 20.

The housing further defines a chamber 26 therewithin in which a diaphragm generally indicated by the numeral 28 reciprocates. The diaphragm 28 includes an actuating rod 30 which moves therewith and which projects into the passage 18 to engage the sphere 24. Springs 32, 34 yieldably urge the diaphragm 28 to the right, viewing FIG. 1, thereby urging the actuating rod 30 against the sphere 24 and thereafter urging the sphere 24 out of sealing engagement with the valve seat 20 to normally permit uninhibited fluid communication between the inlet port 14 and the outlet port 16. However, it will be noted by those skilled in the art that if the diaphragm 28 is moved to the left viewing FIG. 1 away from the position illustrated, the rod 30 will first permit the sphere 24 to engage the valve seat 20 to terminate fluid communication between the port 14 and 16 and thereafter will move an additional distance to expand the volume of the passage 18 between the valve seat 20 and the outlet port 16, thereby reducing the fluid pressure level in the latter and at the wheel cylinders of the vehicle's brakes.

The diaphragm 28 divides the chamber 26 into a first compartment 36 and a second compartment 38. An inlet port 40 communicates the compartment 36 with a source of vacuum, such as the engine manifold. A flow-restricting orifice 42 extends through the diaphragm 28 to communicate the compartment 36 with the compartment 38, so that after a sufficiently long time period after the compartment 36 is initially communicated to the engine vacuum, the pressure level in the compartment 38 will also be subatmospheric at substantially the same level as that existing in the compartment 36. A passage generally indicated by the numeral 44 communicates the compartment 38 with the exterior of the housing 12. A valve seat 46 is formed on a part of a passage 44, and is adapted to cooperate with a valve member 48 which is urged against the valve seat 46 by a spring 50. The valve member 48 is connected to the armature of a solenoid generally indicated by the numeral 52. When a current is passed through the solenoid 52, the armature thereof moves, and since the valve member 48 is secured to the armature, the latter is urged away from the valve seat 46, thereby communicating the compartment 38 with the atmosphere.

The diaphragm 28 includes an annular section generally indicated by the numeral 54, and the orifice 42 extends through annular section 54 in a generally transverse direction. A plurality of passages 56 extend through the annular section 54 in a generally radial direction. The diaphragm 28 includes an annular, flexible, sealing section 58, the inner periphery of which is secured to the rigid portion of the diaphragm and the outer periphery of which is secured to the wall of the housing 12, thereby permitting the rigid portion of the diaphragm 28 to move relative to the housing while sealing the compartment 36 from the compartment 38. It will be noted that as the rigid portion of the diaphragm travels, the flexible portion 58 rolls along the outer circumferential surface 60 of the annular portion 54 of the diaphragm. The passages 56 extend through the annular portion 54 in a general radial direction terminating at the outer circumferential surface 60 of the latter. Therefore, as the rigid portion of the diaphragm travels, the flexible portion 58 rolls along the surface 60 to cover and uncover the passage 56 as the diaphragm moves, thereby varying the rate at which fluid pressure is communicated between the compartment 36 and 38 as will be hereinafter described. However, since the orifice 42 extends through the diaphragm 28 in a generally transverse direction, the flexible portion 58 of the diaphragm can never cover the orifice 42, so that limited fluid communication between the compartments 36 and 38 is always permitted.

MODE OF OPERATION

Figure 2:
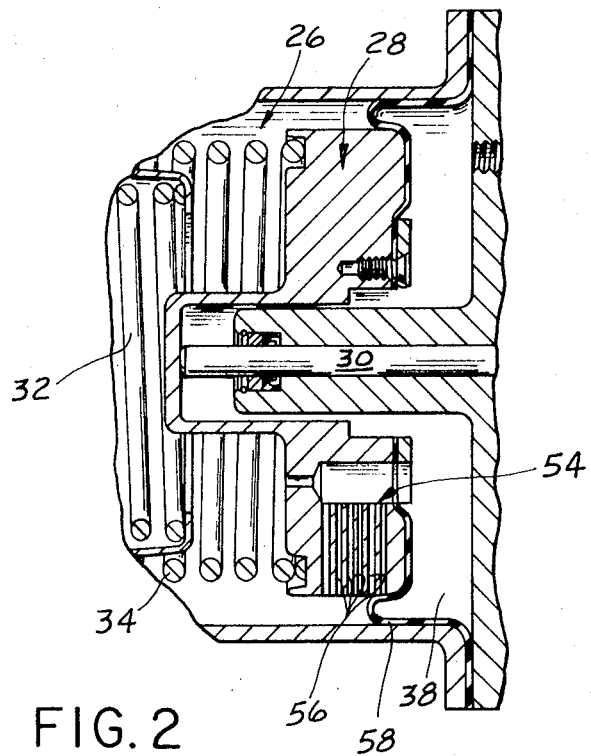
FIG. 2 is a fragmentary, cross-sectional view of the modulator illustrated in FIG. 1, but illustrated with the diaphragm thereof disposed in the extreme actuated position which it assumes during a brake pressure decay cycle.

The various components of the modulator 10 are illustrated in FIG. 1 in the positions in which they assume when the braking system of the vehicle operates normally, requiring no adaptive braking control. In this condition, the control member 30 maintains the sphere 24 out of sealing engagement with the valve seat 20 so that substantially uninhibited fluid communication is permitted from the inlet port 14 to the outlet port 16, thereby permitting the vehicle's springs to be actuated in the customary manner. When the aforementioned logic controller senses an incipient skidding condition requiring operation of the vehicle's adaptive braking system, the logic controller signals the solenoid valve 52 to open, thereby abruptly communicating the compartment 38 with the outside atmosphere. The compartment 38 is normally at subatmospheric pressure level equal to the engine manifold, as is the compartment 36. Therefore, the springs 32, 34 urge the diaphragm 28 to the far right position illustrated in FIG. 1. However, upon actuation of the solenoid valve 52, the compartment 38 is abruptly communicated to the relatively high pressure atmospheric air, thereby urging the diaphragm 28 to the left, viewing FIG. 1, toward the position illustrated in FIG. 2. As the diaphragm 28 moves, actuating rod 30 first moves away from the sphere 24, thereby permitting the spring 22 to urge the sphere 24 into sealing engagement with the valve seat 20, thereby terminating fluid communication between the ports 14 and 16. As the diaphragm moves an additional distance therefore also moving the actuating rod 30, movement of the latter expands the volume of the passage means 18 between the outlet port 16 and the valve seat 20, thereby reducing the pressure in the vehicle's wheel cylinders. Reduction of braking pressure permits the controlled wheel to reaccelerate, and when the logic controller senses that a skidding condition no longer exists, the solenoid valve 52 is released, thereby again terminating fluid communication between the compartment 38 and the atmosphere. Since the diaphragm is now disposed in the position illustrated in FIG. 2, the flexible portion 58 has moved along the circumferential surface 60 during the actuating stroke of the diaphragm 28, thereby uncovering all of the passages 56 so that the compartment 38 is communicated to the compartment 36 not only through the flow-restricting orifice 42, but also through the passages 56. Since the atmospheric air in chamber 38 is communicated through a relatively large flow area to the compartment 36 which is communicated to the engine manifold vacuum, the springs 32, 34 quickly urge the diaphragm 28 to the right, viewing FIGS. 1 and 2 at a relatively rapid rate, therby building braking pressure in the passage 18 at a relatively rapid rate. However, as the diaphragm 28 travels in the return direction during the build cycle, the flexible portion 58 travels along the outer circumferential surface 60 of the rigid portion of the diaphragm, progressively covering the passages 56. As the passages 56 are covered, the rate of fluid flow between the compartments 38 into the compartment 36 is reduced, thereby also reducing the rate at which the diaphragm 28 travels to the right. Since the rate that the pressure is increased in the compartment 18 is directly proportional to the rate of travel of the diaphragm, the rate at which the pressure in the passage 18 is increased is also reduced as the diaphragm 28 approaches the position illustrated in FIG. 1. Therefore, a very desirable non-linear build rate is achieved wherein during the initial portion of the pressure build cycle the pressure increases relatively rapidly, while in the terminal portion of the build cycle, immediately before communication is reinitiated between the inlet port 14 to the outlet port 16, the braking pressure builds at a relatively low rate.

We claim:
1. In an adaptive braking modulator:
a housing having an inlet and an outlet, passage means communicating the inlet with the outlet, and valve means within said passage means normally permitting fluid communication between the inlet and outlet, but closable to a position terminating comunication between the inlet and outlet;
said housing defining a chamber therewithin;
diaphragm means slidable in said chamber in an actuating, and in a return direction, said diaphragm means dividing the latter into first and second compartments, said diaphragm means including a portion extending into said passage means for closing said valve means and thereafter increasing the volume of said passage means, to decay braking pressure at said outlet port upon movement of said diaphragm means in said actuating direction, said diaphragm means being movable in the return direction to reduce the volume of said passage means thereby building braking pressure in said passage means and thereafter opening said valve means;
resilient means urging said diaphragm means in said return direction;
means developing a pressure differential across said diaphragm means for moving said diaphragm means in said actuating direction; and
orifice means extending through said diaphragm means to equalize pressures thereacross, to permit said resilient means to move said diaphragm means in the return direction, said diaphragm means including means responsive to the position of the diaphragm means to vary the effective area of said orifice means as said diaphragm means moves in said return direction whereby braking pressure builds at a non-linear rate.

2. The invention of claim 1:
the effective area of said orifice means being relatively large when said diaphragm means begins said movement in said return direction and being progressively reduced as said diaphragm means travels, whereby said diaphragm means initially moves at a relatively rapid rate to build braking pressure rapidly and thereafter moves at a slower rate to build braking pressure more slowly.

3. The invention of claim 2:
said diaphragm means including a rigid portion, said means responsive to the position of the diaphragm means being a flexible portion of the diaphragm means interconnecting the rigid portion and the wall of said housing;
said orifice means extending through said rigid portion.

4. In an adaptive braking modulator:
a housing having an inlet and an outlet, passage means communicating the inlet with the outlet, and valve means within said passage means normally permitting fluid communication between the inlet and outlet, but closable to a position terminating communication between the inlet and outlet;
said housing defining a chamber therewithin;

diaphragm means slidable in said chamber in an actuating, and in a return direction, said diaphragm means dividing the latter into first and second compartments, said diaphragm means including a portion extending into said passage means for closing said valve means and thereafter increasing the volume of said passage means, to decay braking pressure at said outlet port upon movement of said diaphragm means in said actuating direction, said diaphragm means being movable in the return direction to reduce the volume of said passage means thereby building braking pressure in said passage means and thereafter opening said valve means;

resilient means urging said diaphragm means in said return direction;

means developing a pressure differential across said diaphragm means for moving said diaphragm means in said actuating direction; and orifice means extending through said diaphragm means to equalize pressure thereacross, to permit said resilient means to move said diaphragm means in the return direction, the effective area of said orifice means varying as said diaphragm means moves in said return direction whereby braking pressure builds at a non-linear rate;

the effective area of said orifice means being relatively large when said diaphragm means begins said movement in said return direction and being progressively reduced as said diaphragm means travels, whereby said diaphragm means initially moves at a relatively rapid rate to build braking pressure rapidly and thereafter moves at a slower rate to build braking pressure more slowly;

said diaphragm means including a rigid portion and a flexible portion interconnecting the rigid portion with the wall of said housing;

said orifice means extending through said rigid portion;

said orifice means including a plurality of passages extending through the rigid portion of said diaphragm means;

said flexible portion covering additional passages as said diaphragm means moves to progressively inhibit communication across said diaphragm.

5. The invention of claim 4:

said rigid portion having an annular section separating said first and second compartments, said passage means extending through said annular section, said flexible portion being an annular member, the inner circumferential edge of said flexible portion being secured to said rigid portion and the outer circumferential edge of said flexible portion being secured to said housing, whereby said annular member rolls along said annular section to progressively cover said passages as said diaphragm means moves.

6. In an adaptive braking modulator:

a housing having an inlet and an outlet, passage means communicating the inlet with the outlet, and valve means within said passage means normally permitting fluid communication between the inlet and outlet, but closable to a position terminating communication between the inlet and outlet;

said housing defining a chamber therewithin;

diaphragm means slidable in said chamber in an actuating, and in a return direction, said diaphragm means dividing the latter into first and second compartments, said diaphragm means including a portion extending into said passage means for closing said valve means and thereafter increasing the volume of said passage means, to decay braking pressure at said outlet port upon movement of said diaphragm means in said actuating direction, said diaphragm means being movable in the return direction to reduce the volume of said passage means thereby building braking pressure in said passage means and thereafter opening said valve means;

resilient means urging said diaphragm means in said return direction;

means developing a pressure differential across said diaphragm means for moving said diaphragm means in said actuating direction; and orifice means extending through said diaphragm means to equalize pressures thereacross, to permit said resilient means to move said diaphragm means in the return direction, the effective area of said orifice means varying as said diaphragm means moves in said return direction whereby braking pressure builds at a non-linear rate;

the effective area of said orifice means being relatively large when said diaphragm means begins said movement in said return direction and being progressively reduced as said diaphragm means travels, whereby said diaphragm means initially moves at a relatively rapid rate to build braking pressure rapidly and thereafter moves at a slower rate to build braking pressure more slowly;

said orifice means including a plurality of passages extending through said diaphragm means, said diaphragm means further including control means controlling communication through said passages.

7. The invention of claim 6:

said control means including an annular flexible member sealing said diaphragm means to said housing, said flexible member progressively covering said passages as said diaphragm means moves.

* * * * *